United States Patent [19]

Hanna

[11] Patent Number: 4,830,033
[45] Date of Patent: May 16, 1989

[54] PRESSURE WHEEL WASHER

[76] Inventor: Daniel C. Hanna, 1133 SW. Rivington Dr., Portland, Oreg. 97201

[21] Appl. No.: 745,308

[22] Filed: Jun. 14, 1985

[51] Int. Cl.$^4$ ................................................. B08B 3/02
[52] U.S. Cl. ...................... 134/45; 134/123; 134/172; 134/178; 134/199
[58] Field of Search ................ 134/45, 123, 172, 173, 134/178, 199; 15/DIG. 2

[56] References Cited

U.S. PATENT DOCUMENTS

| | | | |
|---|---|---|---|
| 2,692,214 | 10/1954 | Hurst | 134/123 X |
| 2,716,772 | 9/1955 | Cockrell | 134/45 X |
| 2,718,650 | 9/1955 | Haverberg | 134/123 X |
| 2,761,170 | 9/1956 | Bonneau | 134/45 X |
| 2,822,564 | 2/1958 | Crivelli | 134/45 X |
| 2,910,202 | 10/1945 | Clarke et al. | 134/45 X |
| 3,593,726 | 7/1971 | Lockhart et al. | 134/45 |
| 3,667,486 | 6/1972 | Cole et al. | 134/45 |
| 4,178,948 | 12/1979 | Swinehart | 134/45 |
| 4,269,141 | 5/1981 | Kennett | 134/123 X |
| 4,424,823 | 1/1984 | Gougoulas | 134/45 |

FOREIGN PATENT DOCUMENTS 1550111 8/1979 United Kingdom ................. 134/45

Primary Examiner—Harvey C. Hornsby
Assistant Examiner—Frankie L. Stinson
Attorney, Agent, or Firm—Klarquist, Sparkman, Campbell, Leigh & Whinston

[57] ABSTRACT

A wheel washer has first and second applicators which each have a row of plural spaced nozzles for delivering high pressure fluid to the wheels of a vehicle. The first applicator is fixedly mounted adjacent a track which guides the tires at the driver side of the vehicle. The second applicator is mounted by parallelogram support structure for movement toward and away from the tires at the passenger side of the vehicle. This second applicator is shifted to maintain a desired spacing between the nozzles and the wheels being cleaned, regardless of the width of the vehicle. Cleaning fluid is delivered to one nozzle of each applicator and a laterally disposed nozzle of the other applicator at a time. In succession, the pairs of nozzles apply cleaning fluid to the wheels as the vehicle travels through the vehicle wash. Treadle switches, angled relative to the direction of vehicle travel, are utilized to control the flow of fluid to the desired nozzles of the applicators.

4 Claims, 2 Drawing Sheets

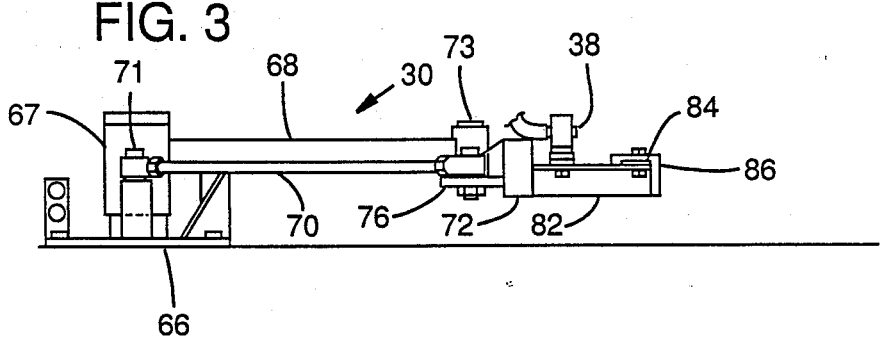
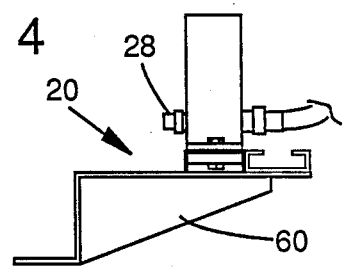
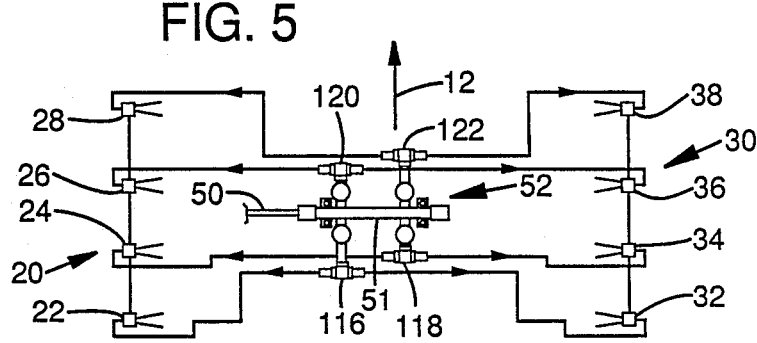
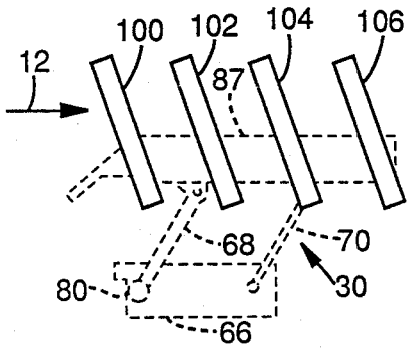
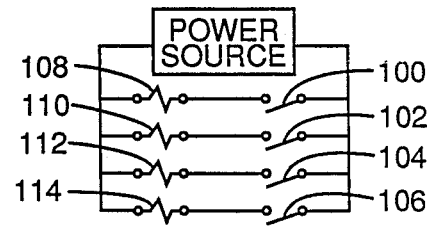

PRESSURE WHEEL WASHER

BACKGROUND OF THE INVENTION

The present invention relates to an apparatus for washing the tire supporting rims or wheels of vehicles, and more particularly to such an apparatus employing high pressure liquid to accomplish the washing.

It is extremely difficult to clean the wheels of automobiles and other vehicles. In particular, the wheels tend to accumulate difficult to remove brake dust from disc brakes and other substances. Moreover, many wheels are spoked and for this reason have difficult to clean areas, such as behind the spokes. Furthermore, some vehicles have extremely deep dish wheels. Such wheels have surfaces which are substantially recessed from the outermost surface of the wheel and are therefore hard to reach and clean.

Heretofore, wheel cleaners have typically utilized rotating brushes for cleaning purposes. However, it is extremely difficult for brushes to clean brake dust from wheels. In addition, brushes typically do not adequately clean hard to reach surfaces, such as the deep dish portions and spoke portions of wheels. Also, some wheels are made of relatively expensive materials, such as magnesium, and are subject to damage by brushes.

Therefore, a need exists for an improved wheel cleaning apparatus.

SUMMARY OF THE INVENTION

The present invention in general comprises an apparatus for applying liquid under high pressure to wheels of a vehicle for cleaning purposes.

In accordance with one more specific aspect of the invention, a first applicator has a first set of nozzles which are positioned along the side of a path of vehicle travel past the nozzles. These first nozzles are aligned in a row, are spaced apart, are positioned at the elevation of the vehicle wheels, and are each aimed at the wheels. A second applicator has a similar second set of nozzles which are located along the side of a path of travel at the other side of the vehicle. Each nozzle of the first set is positioned transversely across the vehicle path from a corresponding nozzle of the second set. Thus, pairs of laterally opposed transversely spaced nozzles are provided. As the front vehicle wheels are moved adjacent to the first nozzles of each set, fluid is sprayed from this pair of first nozzles onto the outer surfaces of the front wheels. Fluid flow to the other nozzles is typically shut off at such times to conserve cleaning fluid. In sequence, each of the successive pairs of nozzles sprays the front wheels as the vehicle travels along the path. In the same manner, the rear wheels of the vehicle are cleaned as they pass the pairs of nozzles.

In accordance with another aspect of the illustrated embodiment of the present invention, the first applicator and first set of nozzles are fixedly mounted along the side of a channel or track of a conveyor which guides the tires, and thus the movement, of the vehicle. This establishes the distance between each nozzle of this first set and the vehicle wheels within a desired range because of the fixed mounting of the nozzles and the confinement of the tires for travel along the tracks. In addition, the second applicator has an adjustable mounting means for supporting the other set of nozzles for movement toward and away from vehicles traveling along the path. This second set of nozzles is selectively shifted toward and away from such vehicles as required to keep a desired spacing between the nozzles of the second set and the wheels of such vehicles. This maintains the nozzle to wheel spacing within a desired range as vehicles of different widths are washed.

More specifically, this mounting means may comprise a parallelogram support having a tire engagement means which is engaged by tires of relatively wide vehicles. When engaged by the tires, the tire engagement means shifts the mounting means and thus the second set of nozzles into a position which establishes the spacing between the nozzles and the vehicle wheels.

As still another feature of the present invention, treadle switches are positioned for engagement by tires of the vehicles being washed. Each of these treadle switches controls the flow of fluid to an associated pair of nozzles, one nozzle from the first set and a laterally opposed nozzle from the second set. As the tires travel across the treadle switches, the successive pairs of laterally opposed nozzles spray cleaning fluid onto the wheels for cleaning purposes.

As still another feature of the present invention, the treadle switches are positioned for engagement by those tires of the vehicle which are not traveling in the track. Also, these switches are angled relative to the direction of vehicle travel. Because of this angling, the treadle switches are engaged at a time when the nozzles are aimed toward the wheels, even though the nozzle mounting means may have shifted position It is accordingly one object of the present invention to provide an improved wheel washer.

It is another object of the invention to provide a wheel washer employing high pressure liquid for cleaning vehicle wheels.

It is still another object of the present invention to provide a vehicle wheel washer which more effectively cleans brake dust and other hard to clean dirt from wheels.

A further object of the present invention is to provide a wheel washer which cleans hard to reach areas of vehicle wheels more effectively.

Still another object of the present invention is to provide a wheel washer for cleaning wheels of vehicles without touching such wheels, except with cleaning solution.

A still further object of the present invention is to provide a wheel washer for cleaning wheels of vehicles which minimizes the risk of damage to the wheels.

Still another object of the present invention is to provide a wheel washer which conserves liquid utilized in cleaning wheels of the vehicle.

Still another object of the present invention is to provide a wheel washer which effectively applies pressurized cleaning liquid to vehicle wheels, regardless of the width of the vehicle.

These and other objects, features and advantages of the present invention will become apparent with reference to the following description and drawings.

BRIEF DESCRIPTION OF THE DRAWINGS

FIG. 3 is an end view of the movable applicator of FIG. 2 taken in the direction of lines 3—3 of FIG. 1;

FIG. 4 is an end view of a fixed wheel washing applicator of the apparatus of FIG. 1;

FIG. 5 is a schematic diagram of the liquid flow control system utilized in the apparatus of FIG. 1;

FIG. 6 is a top plan view of a treadle switch control mechanism for controlling the delivery of liquid to the respective nozzles of the apparatus of FIG. 1; and FIG. 7 is an electrical schematic diagram of a control circuit employed in the apparatus of FIG. 1.

DETAILED DESCRIPTION OF PREFERRED EMBODIMENT

Figure 1:
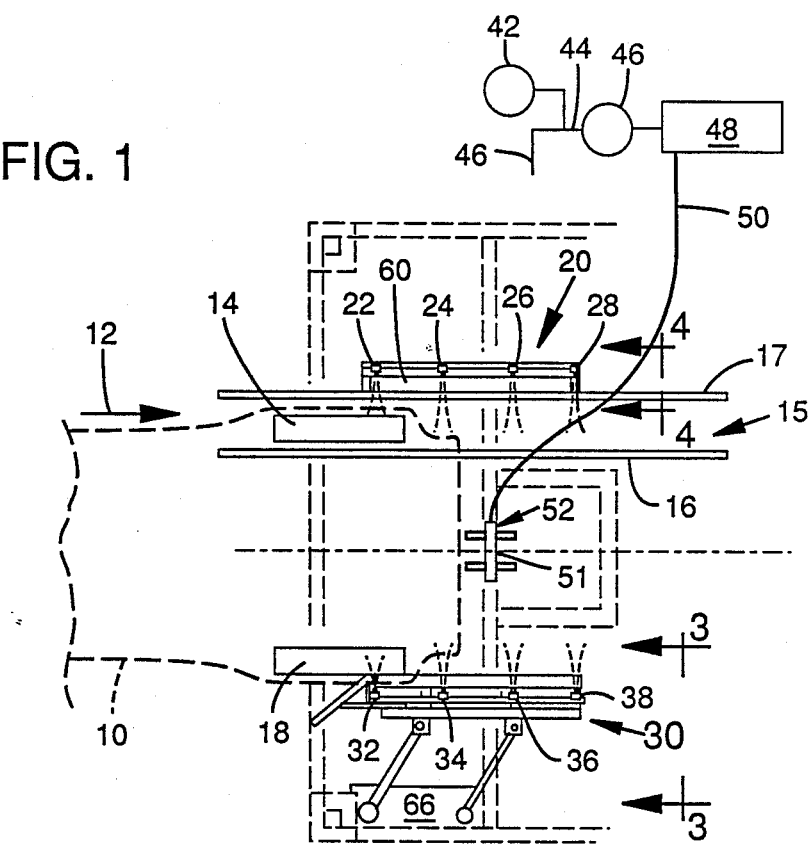
FIG. 1 is a top plan view of a pressure wheel washing apparatus in accordance with the present invention.

With reference to FIG. 1, a vehicle 10 is shown traveling in a direction indicated by an arrow 12 through a vehicle wash. One set of tires, in this case the tires 14 at the driver's side of the vehicle are guided by a track 15 of a conventional conveyor which moves the vehicle. Track 15 has inner and outer tire guiding rails 16, 17. One suitable conveyor is shown in U.S. Pat. No. 3,554,132 of Daniel C. Hanna. The set of tires 18 at the passenger's side of the vehicle are unguided.

The pressure wheel washer includes a first applicator assembly 20 having plural conventional nozzles for applying cleaning fluid to the wheels of the tires 14 as the wheels pass the nozzles. The illustrated applicator 20 has four such nozzles 22, 24, 26 and 28. The nozzles 22 through 28 are aligned in a row, are spaced apart, and are at the elevation of and aimed at the wheels or rims which support the tires 14. A second applicator assembly 30, with nozzles 32, 34, 36 and 38, is transversely spaced from the applicator assembly 20. The second applicator assembly 30 comprises a means for applying cleaning fluid to the wheels of the tires 18 at the opposite side of the vehicle. Like the nozzles 22 through 28, the nozzles 32 through 38 are spaced apart, are aligned in a row, and are at the elevation of and aimed at the wheels supporting the tires 18. Moreover, as apparent from FIG. 1, the applicator assemblies 20 and 30 are arranged such that there are laterally opposed pairs of nozzles. One nozzle of each pair is on applicator 20 and a corresponding nozzle of the pair is on applicator 30. That is, nozzles 22 and 32, 24 and 34, 26 and 36, and 28 and 38 comprise such laterally opposed pairs of nozzles.

As explained more fully below, as the vehicle 10 is moved along the track 15, the pairs of nozzles are selectively operated to deliver cleaning fluid under pressure to the vehicle wheels insequence. That is, nozzles 22 and 32 first deliver cleaning fluid to the wheels, nozzles 24 and 34 then deliver cleaning fluid to the wheels, nozzle 26 and 36 thereafter deliver cleaning fluid to the wheels, and finally nozzles 28 and 38 deliver cleaning fluid to the wheels. In this manner, the wheels are exposed to successive bursts of high pressure cleaning fluid as the wheels are moved past the successive pairs of nozzles.

Typically, detergents, water, or other cleaning fluid is delivered to the nozzles. For example, a concentrated detergent or other chemical cleaner is stored in a concentrate container 42. The concentrated chemicals from container 42 are pumped or otherwise delivered to a commercially available proportional mixing valve 44 which also receives water from a water supply line 46. Suitable proportioner valves are available from Dema Engineering Company of St. Louis, Mo. From valve 44, the chemical and water mixture passes to a mixing tank 46. A pump 48 pumps the mixed cleaning fluid from tank 46 via a line 50 to a manifold 51 of a manifold and valve assembly 52. From the manifold and valve assembly, the cleaning fluid is selectively delivered, as explained below in connection with FIGS. 5, 6 and 7, to the nozzles of the applicators 20 and 30.

In the illustrated embodiment, the nozzles are each aimed at a height of approximately seven inches above the surface on which the tires of the vehicle travel. In addition, the nozzles are spaced apart approximately 16 inches. Also, cleaning fluid is delivered to the nozzles at a typical pressure of 750 psi with the nozzles being spaced from the wheels as explained below. In addition, typical nozzles are selected to apply cleaning fluid to the wheels at the approximate rates of from five to ten gallons per minute. The higher flow rate nozzles are used for applications in which relatively fast conveyor speeds are used and also in which the wheels are heavily soiled. In contrast, the lower flow rate nozzles are used when light wheel soiling is expected or when conveyor speed is relatively slow, such as when relatively few cars are being washed.

Under these conditions, the cleaning fluid effectively cleans brake dust and other difficult to clean substances from wheels. In addition, the cleaning fluid reaches and cleans the spokes of spoked wheels. Also, cleaning of deep dished wheels is achieved. Moreover, as cleaning fluid is the only substance which touches the wheels, wheels of expensive materials, such as magnesium, may be cleaned without the risk of damage from bristles of wheel washing brushes.

As pressure is reduced below 750 psi, some degradation in cleaning results. However, satisfactory cleaning is still achieved with pressures as low as 600 psi and perhaps somewhat lower. In addition, as pressure is increased above 750 psi, cleaning is enhanced. However, stronger conduits, valves and fittings are required as the pressure exceeds about 900 psi. Also, excessive pressure can damage chrome and paint which may be on the wheels. Thus, a typical range of preferred pressures is from 600 to 900 psi.

Referring to FIGS. 1 and 4, the applicator assembly 20 includes a mounting bracket 60 which is fixedly mounted to the floor or other supporting surface of the vehicle wash, such as to the base of the outer guide rail 17 of the track 16. The nozzles 22 through 28 are supported by the mounting bracket 60 at the desired elevation above the floor of the vehicle wash. In addition, bracket 60 is positioned to support the nozzles 22 through 28 in a line which is generally parallel to the track 15 and thus to the direction of travel 12 of the vehicle being washed. More specifically, at the high pressures utilized in the present invention, enhanced cleaning is achieved when the nozzles are maintained within a lateral distance which is no greater than approximately eighteen inches from the passing wheels being washed. In the illustrated embodiment, at the driver side, the nozzles are laterally spaced typically from two to ten inches from the wheel being washed, well within the desired approximate eighteen inch maximum. That is, the nozzles are typically spaced about two inches from the inside edge of outer guide rail 17. Consequently, if the vehicle tires 14 bear against this outer guide rail, the nozzles are approximately two inches from the passing wheels. A typical track 15 is twelve inches wide and typical tires are at least four inches wide. Therefore, if the tires 14 bear against the inner rail 16, the nozzle to wheel spacing is a maximum of about ten inches (eight inches from the outer surface of the tires to guide rail 17 plus two inches from this guide rail to the nozzles). Thus, with the bracket 60 at a fixed position and the tires 14 confined to move along the track 15, the distance between the nozzles 22 through 28 and wheels of tires 14 is controlled. As a result, for a given fluid pressure at the nozzles 22 through 28, effective application of cleaning fluid to the surface of the wheel being cleaned is achieved.

Figure 2:
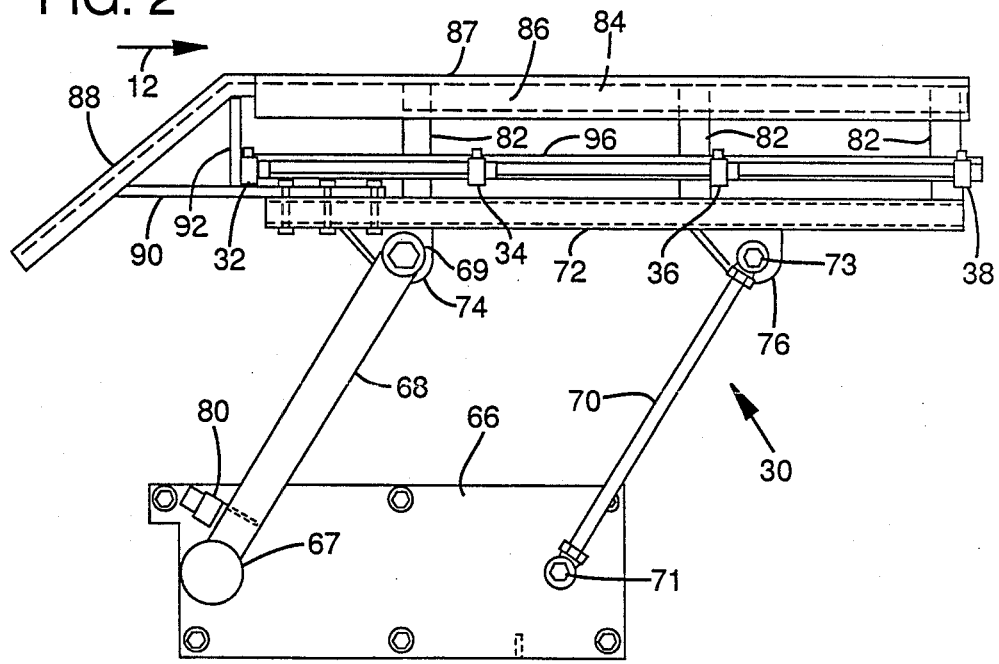
FIG. 2 is a top plan view of a movable wheel washing applicator of the apparatus of FIG. 1.

Referring to FIGS. 1, 2 and 3, applicator 30 supports the nozzles 32 through 38 for movement toward and away from the track 15 so as to accommodate vehicles of different widths. More specifically, the nozzles 32 through 38 of this applicator are supported by a parallelogram support mechanism comprised of a base plate 66, an arm 68, a rod 70, and an elongated box-beam cross bar 72. The base plate 66 is mounted to the floor or other supporting surface of a vehicle wash. The arm 68 and rod 70 are parallel to one another. In addition, the arm 68 is pivoted at one end 67 to the plate 66 and at its other end 69 to a projecting flange 74 which is secured to the cross bar 72. The rod 70 is also pivoted at one end 71 to the base plate 66 and at its other end 73 to a flange 76 projecting from the cross bar. A stop 80, mounted to plate 66, limits the travel of the arm 68, and thus applicator 30, rearwardly in a direction counter to the direction of vehicle travel 12. A biasing mechanism, in this case a coil spring (not shown), but surrounding a spindle which pivots the arm end 67 to the plate 66, urges the arm 68 against the stop 80.

Plural vehicle tire bumper supporting projections 82 extend outwardly from the cross bar 72. The projections 82 are typically welded or otherwise secured to the cross bar. A flat cross piece 84 interconnects the outer or free ends of the projections 82. An elongated tire bumper 86 is bolted or otherwise mounted to the cross piece 84 and thus to the outer ends of the projections 82. As is apparent from FIG. 3, the illustrated bumper 86 is of right angular construction with an outer guiding surface 87. In addition, the bumper is of a material, such as ultra high molecular weight polyethylene, which permits the tires and wheels to easily slide along the bumper surface 87 without damage. A bumper extension 88, supported by reinforcing pieces 90, 92 projecting from the cross bar 72, is positioned to engage an approaching tire 18 of a vehicle. Bumper extension 88 projects rearwardly from the outer surface 87 of the bumper 86 and is angled away from the vehicle path.

Applicator 30 may be positioned such that the bumper 86 is engaged by even the narrowest vehicle. However, applicator 30 is typically mounted far enough away from track 15 to allow narrow vehicles to pass applicator 30 without engaging bumper surface 87. Yet the nozzle to wheel spacing is maintained within the approximate maximum eighteen inch distance for effective cleaning. As a specific example, the nozzles of applicator 30 are laterally spaced from the nozzles of applicator 20 sixty-six inches when applicator 30 is in its rest position. The narrowest cars have typical axle lengths, measured from the outer surface of one tire to the outer surface of the transversely spaced tire, of about fifty-five inches and frequently have tires which are about six inches wide. When the tires 14 of such vehicles bear against the rail 17, the nozzles 32 through 38 are spaced nine inches from the outer surface of the passing tires 18, and thus of the wheels being washed. That is, sixty-six inch spacing between the nozzles, less two inches nozzle to rail 17 spacing, less the axle length of fifty-five inches, equals nine inches. In contrast, when the tires 14 of such vehicles bear against the rail 16, the nozzles 32 through 38 are spaced three inches from the outer surface of the passing wheels. As most vehicle tires 14 travel somewhere between the guide rails 16, 17, in this example, the lateral spacing between nozzles 32 through 38 and the passing wheels is typically between three and nine inches.

As a tire 18 of a wide vehicle engages the bumper extension 88 and the vehicle 10 travels forwardly in the direction of arrow 12, the tire shifts applicator 30 in a direction away from the track 15 and the oncoming vehicle. As vehicle travel continues, applicator 30 is eventually shifted sufficiently to enable the tire 18 to slide along the outer surface 87 of the bumper 86.

The nozzles 32 through 38 are mounted to a nozzle support bracket 96 which is attached to the projections 82 and reinforcing pieces 90, 92. This establishes a fixed distance between these nozzles and the outer surface 87 of the bumper 86. An exemplary lateral spacing between the bumper surface 87 and the nozzles 32 through 38 is about two and one half inches. This establishes the minimum distance between these nozzles and the wheel being washed. Thus, a fixed distance is thereby maintained between the nozzles and the wheel which is washed when a tire supported by such wheel slides against the bumper surface 87.

Therefore, for a given fluid pressure at the nozzles 32 through 38, an effective application of cleaning fluid is achieved at the surface of the wheel being cleaned. In addition, this cleaning is achieved for vehicles of varying widths because the distance between the nozzles and the wheels of such vehicles is kept relatively close even though the vehicle width varies.

With reference to FIGS. 5, 6 and 7, the delivery of the cleaning fluid to the nozzles will next be described. Although each of the nozzles may be operated simultaneously, to conserve cleaning fluid in the illustrated embodiment and to conserve cleaning fluid, the laterally opposed pairs of nozzles are operated in sequence as vehicle wheels pass the nozzles That is, fluid is delivered to the pair of nozzles 22, 32 while fluid flow to the other nozzles is off. Then, fluid is supplied to the pair of nozzles 24 and 34 while fluid flow to the other nozzles is off. Thereafter, fluid is supplied to the nozzles 26 and 36 while fluid flow to the other nozzles is off. Finally, the nozzles 28 and 38 are supplied with fluid while flow to the other nozzles is off.

This selective delivery of cleaning fluid to the pairs of nozzles is controlled in the illustrated embodiment by a series of four treadle switches (FIG. 6) 100, 102, 104 and 106 mounted to the floor or other supporting surface of the vehicle wash. Such switches are elongated and positioned to be run over by the tires 18 of the vehicle. As a tire 18 runs over a treadle switch, the switch closes. Upon closing of a switch, as shown in FIG. 7, a circuit through the switch is closed and a valve operating solenoid in series with the switch is energized from a power source. These solenoids are indicated respectively as 108, 110, 112 and 114 in FIG. 7. When solenoid 108 is energized, the solenoid opens a normally closed valve 116. From FIG. 5, it is apparent that when valve 116 is open, cleaning fluid passes from manifold 51, through the valve 116 and through conduits to the respective nozzles 22 and 32. In a similar manner, when solenoid 110 is energized, a normally closed valve 118 is opened and cleaning fluid passes through this valve to the nozzles 24 and 34. In addition, when solenoid 112 is energized a valve 120 is opened and cleaning fluid passes through the nozzles 26 and 36. Finally, when solenoid 114 is energized a valve 122 is opened and cleaning fluid is delivered through this valve to the nozzles 28 and 38.

Thus, as the vehicle moves through the vehicle wash and a tire 18 successively engages the treadles 100 through 106, the wheel which supports this tire is cleaned by the nozzles 32 through 38. In addition, the transversely spaced wheel is also simultaneously cleaned by the nozzles 22 through 28.

As shown in FIG. 6, the longitudinal axis of the treadles 100 through 106 is at an angle relative to the outer surface 87 of the bumper 86 and thus relative to the direction of travel 12. As a result, for a relatively wide vehicle in which the bumper 86 is shifted forwardly, the treadle 100 is engaged by the tire 18 after the vehicle has traveled further in the direction 12 in comparison to the position of a narrower vehicle when its tire 18 engages the treadle 100. As a result, when treadle 100 and the successive treadles are engaged, the nozzle is directed generally toward a section of a wheel, regardless of the width of the vehicle.

Having illustrated and described the principles of my invention with reference to one preferred embodiment, it should be apparent to those persons skilled in the art that such invention may be modified in arrangement and detail without departing from such principles. For example, both of the applicators 20, 30 may be fixed or movable. I claim as my invention all such modifications as come within the true spirit and scope of the following claims.

I claim:

1. A vehicle wheel washing apparatus for applying high pressurized fluid from a source of such fluid to the wheels of a vehicle traveling along a path past the apparatus, the wheels at a first side of the vehicle traveling along a fixed track, comprising:

a first pressurized fluid applicator means fixedly mounted along the first side of the path of vehicle travel, the first applicator means having plural spaced apart nozzles mounted for aiming at the wheels at a first side of a vehicle for delivering pressurized cleaning fluid to the wheels of the vehicle as the wheels pass the nozzles;

a second pressurized fluid applicator means transversely spaced from the first applicator means along a second side of the path of vehicle travel, the second applicator means having plural spaced apart nozzles mounted for aiming at the wheels at a second side of a vehicle for delivering pressurized cleaning fluid to the wheels of a vehicle as the wheels pass the nozzles;

applicator support means for supporting the second applicator means for movement from a first position which is transversely spaced a first distance from the first applicator means to second position a transversely spaced second distances from the first applicator means which are greater than the first distance;

position shifting means for moving the second applicator means from the first to second positions so as to position the second applicator means outside of the path of vehicle travel as the widths of vehicles passing the first and second applicator means varies and so as to maintain the nozzles of the second applicator means adjacent to the passing wheels for applying pressurized fluid to such wheels; and flow control means for selectively delivering pressurized fluid to the nozzles of the first and second applicator means at times when wheels of passing vehicles are adjacent to the nozzles, the flow control means including plural elongated treadle switch means engaged by the tires at the second side of the vehicle adjacent the second applicator means at times when the wheels supporting such tires are adjacent to the nozzles, the longitudinal axis of each of the treadle switch means being angled at am acute angle relative to the direction of vehicle travel past the apparatus with the portion of the treadle which is nearest to the second applicator means being further along the direction of vehicle travel than the portion of the treadle which is furthest from the second applicator means, 2. A vehicle wheel washing apparatus for applying high pressurized fluid from a source of such fluid to the wheels of a vehicle traveling along a path past the apparatus, the wheels at a first side of the vehicle traveling along a fixed track, comprising:

a first pressurized fluid applicator means fixedly mounted along the first side of the path of vehicle travel, the first applicator means having plural spaced apart nozzles mounted for aiming at the wheels at a first side of a vehicle for delivering pressurized cleaning fluid to the wheels of the vehicle as the wheels pass the nozzles;

a second pressurized fluid applicator means transversely spaced from the first applicator means along a second side of the path of vehicle travel, the second applicator means having plural spaced apart nozzles mounted for aiming at the wheels at a second side of a vehicle for delivering pressurized cleaning fluid to the wheels of a vehicle as the wheels pass the nozzles;

applicator support means for supporting the second applicator means for movement from a first position which is transversely spaced a first distance from the first applicator means to second positions transversely spaced second distances from the first applicator means which are greater than the first distance;

position shifting means for moving the second applicator means from the first to second positions so as to position the second applicator means outside of the path of vehicle travel as the widths of vehicles passing the first and second applicator means varies and so as to maintain the nozzles of the second applicator means adjacent to the passing wheels for applying pressurized fluid to such wheels; and flow control means for selectively delivering pressurized fluid to the nozzles of the first and second applicator means at times when wheels of passing vehicles are adjacent to the nozzles, the nozzles of the first applicator means being laterally disposed from a corresponding nozzle of the second applicator means, the laterally disposed nozzles comprising respective pairs of nozzles, the flow control means comprising means operable independently of the position shifting means for selectively allowing the flow of pressurized fluid to the pairs of nozzles in succession with the flow of fluid being allowed to only one pair of nozzles at a time.

3. A vehicle wheel washing apparatus for applying high pressurized fluid from a source of such fluid to the wheels of a vehicle traveling along a path past the apparatus comprising:

a first pressurized fluid applicator means along a first side of the path of vehicle travel, the first applicator means having plural spaced apart nozzles aimed at the wheels of a vehicle for delivering pressurized cleaning fluid to the wheels of a vehicle as the wheels pass the nozzles;

a second pressurized fluid applicator means transversely spaced from the first applicator means along a second side of the path of vehicle travel, the second applicator means having plural spaced apart nozzles aimed at the wheels of a vehicle for delivering pressurized cleaning fluid to the wheels of a vehicle as the wheels pass the nozzles;

flow control means for selectively delivering pressurized fluid to the nozzles of the first and second applicator means at times when wheels of passing vehicles are adjacent to the nozzles, the nozzles of the first applicator means each being laterally disposed from a corresponding nozzle of the second applicator means, the laterally disposed nozzles comprising respective pairs of nozzles, the flow control means comprising means operable independently of the position shifting means for selectively allowing the flow of pressurized fluid to the pairs of nozzles in succession with the flow of fluid being allowed to only one pair of nozzles at a time.

4. A vehicle wheel washing apparatus according to claim 3 in which the second of the applicator means includes mounting means for supporting the second applicator means for movement toward and away from the center of the path of vehicle travel, the first applicator means including means for mounting the first applicator means in a fixed position.

* * * * *